United States Patent
El-Gillani

(10) Patent No.: US 9,361,085 B2
(45) Date of Patent: Jun. 7, 2016

(54) SYSTEMS AND METHODS FOR INTERCEPTING, PROCESSING, AND PROTECTING USER DATA THROUGH WEB APPLICATION PATTERN DETECTION

(71) Applicant: Cloudmask, Ottawa (CA)

(72) Inventor: Tarek El-Gillani, Ottawa (CA)

(73) Assignee: Cloudmask, Ontario (CA)

( * ) Notice: Subject to any disclaimer, the term of this patent is extended or adjusted under 35 U.S.C. 154(b) by 0 days.

(21) Appl. No.: 14/202,931

(22) Filed: Mar. 10, 2014

(65) Prior Publication Data

US 2014/0282464 A1 Sep. 18, 2014

Related U.S. Application Data

(60) Provisional application No. 61/802,850, filed on Mar. 18, 2013.

(51) Int. Cl.
*G06F 9/44* (2006.01)
*G06F 9/445* (2006.01)
*G06F 21/60* (2013.01)
*G06F 17/30* (2006.01)
*G06F 21/62* (2013.01)

(52) U.S. Cl.
CPC .. *G06F 8/61* (2013.01); *G06F 8/33* (2013.01); *G06F 8/65* (2013.01); *G06F 17/30* (2013.01); *G06F 21/602* (2013.01); *G06F 21/6245* (2013.01)

(58) Field of Classification Search
CPC ......................................................... G06F 8/33
USPC .................................................. 717/110, 111
See application file for complete search history.

(56) References Cited

U.S. PATENT DOCUMENTS

| | | | |
|---|---|---|---|
| 6,363,373 B1 * | 3/2002 | Steinkraus | |
| 7,269,636 B2 * | 9/2007 | McCollum | G06F 17/3089 707/E17.116 |
| 7,480,921 B1 * | 1/2009 | Vigesaa | G06F 17/3089 707/E17.116 |
| 7,685,206 B1 * | 3/2010 | Mathew et al. | 707/785 |
| 8,200,962 B1 * | 6/2012 | Boodman | G06F 21/53 713/161 |
| 8,458,487 B1 * | 6/2013 | Palgon | G06F 21/00 380/277 |
| 8,464,148 B1 * | 6/2013 | Wichary | 715/255 |
| 8,756,579 B1 * | 6/2014 | Colton | G06F 11/36 717/124 |
| 2006/0184640 A1 * | 8/2006 | Hatch | 709/217 |
| 2008/0228862 A1 * | 9/2008 | Mackey | G06F 11/3409 709/203 |
| 2011/0055912 A1 * | 3/2011 | Fusari et al. | 726/8 |

(Continued)

OTHER PUBLICATIONS

Scoping SIG, Tokenization Taskforce PCI Security Standards Council; PCI Data Security Standard (PCI DSS); Version 2.0; Aug. 2011. https://www.pcisecuritystandards.org/documents/Tokenization_Guidelines_Info_Supplement.pdf.

(Continued)

*Primary Examiner* — Phillip H Nguyen

(74) *Attorney, Agent, or Firm* — Wolf, Greenfield & Sacks, P.C.

(57) ABSTRACT

Systems and methods of intercepting user data of a web application are provided. After web application resources are obtained for execution on a client device, methods that process user data of the web application are added to create modified web application resources. Certain runtime application calls are intercepted. This can be achieved by modifying the actual code to replace calls to certain functions with calls to the added methods, or by using overloading. The data processing may add data security functionality.

29 Claims, 9 Drawing Sheets

(56) References Cited

U.S. PATENT DOCUMENTS

| | | | |
|---|---|---|---|
| 2012/0005720 A1 | 1/2012 | McGloin et al. | |
| 2012/0133662 A1* | 5/2012 | Morris | 345/581 |
| 2012/0158823 A1* | 6/2012 | Ahuja et al. | 709/203 |
| 2012/0192155 A1* | 7/2012 | Silbey et al. | 717/125 |
| 2012/0259877 A1 | 10/2012 | Raghunathan et al. | |
| 2012/0278621 A1 | 11/2012 | Woloszyn | |
| 2013/0173576 A1* | 7/2013 | Baluja et al. | 707/706 |
| 2013/0311593 A1* | 11/2013 | Prince et al. | 709/213 |
| 2014/0244830 A1* | 8/2014 | Smacinih | H04L 67/02 709/224 |

OTHER PUBLICATIONS

Voltage Security; Format-Preserving Encryption; 2003-2014 Voltage Security, Inc., downloaded on Dec. 22, 2014. http://www.voltage.com/technology/format-preserving-encryption/.

Bellare, Mihir; The FFX Mode of Operation for Format-Preserving Encryption; Feb. 20, 2010. http://csrc.nist.gov/groups/ST/toolkit/BCM/documents/proposedmodes/ffx/ffx-spec.pdf.

Ramsdell & Turner, Internet Engineering Task Force (IETF), Standards Track, ISSN 2070-1721, Secure/Multipurpose Internet Mail Extensions (S/MIME) Version 3.2 Message Specification, Jan. 2010. https://tools.ietf.org/html/rfc5751.

B. Kaliski, RSA Laboratories, East; Network Working Group; PKCS #7: Cryptographic Message Syntax, Version 1.5; Copyright (C) The Internet Society (1998); Mar. 1998. http://tools.ietf.org/html/rfc2315.

Federal Information Processing Standards Publication 197, Nov. 26, 2001, Announcing the Advanced Encryption Standard (AES). http://csrc.nist.gov/publications/fips/fips197/fips-197.pdf.

FIPS Pub 186-4; Federal Information Processing Standards Publication; Digital Signature Standard (DSS); Category: Computer Security; Subcategory: Cryptography, Information Technology Laboratory, National Institute of Standards and Technology, Gaithersburg, MD 20899-8900; Issued Jul. 2013. http://nvlpubs.nist.gov/nistpubs/FIPS/NIST.FIPS.186-4.pdf.

W3C Architecture domain; Document Object Model (DOM); Jan. 19, 2005, Maintained by the W3C DOM IG. http://www.w3.org/DOM/.

ECMA International; Standard ECMA-262, 5.1 Edition/Jun. 2011, ECMAScript Language Specification. http://www.ecma-international.org/publications/files/ECMA-ST/Ecma-262.pdf.

W3C > Standards > Web Designs and Applications; Copyright © 2013 W3C®, downloaded on Dec. 22, 2014. http://www.w3.org/standards/webdesign/.

Berners-Lee, et al.; Network Working Group; Hypertext Transfer Protocol—HTTP/1.0; May 1996. http://tools.ietf.org/html/rfc1945.

Dierks & Rescorla; Network Working Group; The Transport Layer Security (TLS) Protocol Version 1.2; Aug. 2008. http://tools.ietf.org/html/rfc5246.

W3C, Architecture of the World Wide Web, vol. One; W3C Recommendation, Dec. 15, 2004. http://www.w3.org/TR/2004/REC-webarch-20041215/.

W3C HTML5; A Vocabulary and Associated APIs for HTML and XHTML; W3C Recommendation Oct. 28, 2014. http://www.w3.org/TR/2014/REC-html5-20141028/.

W3C Document Object Model (DOM) Level 2 Core Specification, Version 1.0; W3C Recommendation Nov. 13, 2000. http://www.w3.org/TR/2000/REC-DOM-Level-2-Core-20001113.

W3C Document Object Model (DOM) Level 2 HTML Specification, Version 1.0; W3C Recommendation Jan. 9, 2003. http://www.w3.org/TR/2003/REC-DOM-Level-2-HTML-20030109.

W3C Document Object Model (DOM) Level 3 Core Specification, Version 1.0; W3C Recommendation Apr. 7, 2004. http://www.w3.org/TR/2004/REC-DOM-Level-3-Core-20040407.

W3C Document Object Model (DOM) Level 2 Events Specification, Version 1.0; W3C Recommendation Nov. 13, 2000. http://www.w3.org/TR/2000/REC-DOM-Level-2-Events-20001113.

W3C Document Object Model (DOM) Level 1 Specification, Version 1.0; W3C Recommendation Oct. 1, 1998. http://www.w3.org/TR/1998/REC-DOM-Level-1-19981001.

* cited by examiner

SYSTEMS AND METHODS FOR INTERCEPTING, PROCESSING, AND PROTECTING USER DATA THROUGH WEB APPLICATION PATTERN DETECTION

CROSS REFERENCE TO RELATED APPLICATION

This application claims the benefit of U.S. Provisional Application No. 61/802,850 filed Mar. 18, 2013, hereby incorporated by reference herein in its entirety, and also included herein as appendix A.

FIELD OF INVENTION

The invention relates to web application software engineering, information security, data integration, and cloud computing architecture.

BACKGROUND

Web based applications rely on web application services to process and persist user data. These services are hosted and managed within an environment that is typically outside of the user control. Such an environment may be under the control of an independent public application provider, referred to as public cloud. It may also be under the control of a private application provider representing an independent department within the same organization as the end user.

In both cases, private user data is exposed and controlled by an independent entity which introduces security risks. User data is by design exposed to the application provider software/hardware components. As a result, from the end-user's perspective, an additional security risk is introduced. At the same time, users have no choice but to delegate the security measures and controls to the application provider, which is an independent entity.

This is true even when data is transmitted through secure protocols such as HTTPS and stored in encrypted format by the application provider, since in all cases the clear-text user data is still available in memory to the application provider.

The problem is further exacerbated in cases where regulations in certain jurisdictions prohibit the use of public cloud applications residing in other jurisdictions, due to data privacy regulations.

SUMMARY OF INVENTION

In some embodiments, methods are provided that automatically detect and intercept user data. Once intercepted, different processing may be performed including execution of security algorithms.

Instead of intercepting the network payload, components may be added to the web application client-side runtime environment.

In one embodiment of the invention, an extension is installed in the browser hosting the resources of the web applications. As the user, or application JavaScript logic, performs operations, the extension functionality matches these operations against known patterns (web patterns) and accordingly invokes methods (handlers) to perform desired data processing such as tokenization and encryption.

Some embodiments rely on detecting patterns commonly used by web applications to interact with users and application services. By detecting these patterns, some embodiments of the invention are able to intercept and process user data independent of the application in question, and without being sensitive to network payload changes.

Some embodiments feature a pre-configured set of common patterns. Some embodiments allow for existing patterns to be extended and new patterns configured.

Advantageously, some embodiments are application-neutral and do not rely on a gateway, thus allowing mobile users to directly connect to application providers.

In some embodiments, security is achieved by configuring handlers to perform tokenization and/or encryption functions. In doing so, encryption can use a personal private key (e.g. as part of a certificate), thus providing higher level of security than that offered by the application or gateway provider.

According to one aspect of the present invention, there is provided a processor implemented method on a device, the method comprising: receiving web application resources associated with a web application; modifying the web application resources by adding methods at least some of which pertain to processing of user data of the web application.

In some embodiments, the method further comprises for at least one of the added methods: the added method overloads a runtime API method such that calls to the runtime API method are intercepted during execution.

In some embodiments, the method further comprises: initiating further modification of the web application resources to produce modified resources by replacing calls to at least one first method that pertains to processing of user data with calls to at least one of the added methods such that calls to the first methods are intercepted prior to execution.

In some embodiments, the method further comprises for at least one of the added methods: the added method overloads a runtime API call such that calls to the runtime API method are intercepted during execution; the method further comprising: initiating modification of the web application resources to produce modified resources by replacing calls to at least one first method that pertains to processing of user data with calls to at least one of the added methods such that calls to the first methods are intercepted prior to execution, wherein the at least one first method is a method for which a method has not been added that overloads a call to the first method.

In some embodiments, the method further comprises each added method that pertains to the processing of user data processes user data without modifying control data for the web application.

In some embodiments, the added methods comprise: at least one data handler that processes user data; a rules engine that applies rules for each intercepted call to determine whether to process the user data with a data handler of the at least one data handler and/or to select which data handler to be used to process the user data.

In some embodiments, applying rules matching comprises attempting to identify patterns associated with an application runtime that pertain to the exchange of user data.

In some embodiments attempting to identify patterns comprises attempting to identify at least one of the following patterns involving exchange of user data: loading HTML or Script URL in which user data is sent as part of the URL or in which HTML/Script content contains user data from as server; an HTML Form action carried out through HTTP (client data to server); asynchronous messaging calls.

In some embodiments at least one added method implements a security feature.

In some embodiments, at least one added method implements a security feature by: i) processing outgoing data by: a) tokenizing the user data to produce tokenized user data and returning the tokenized user data; b) encrypting the user data to produce encrypted user data; c) creating a mapping between the encrypted user data and the tokenized user data; ii) the security feature processes incoming data by: d) extracting tokenized data; e) demapping the tokenized data to obtain corresponding encrypted user data; f) decrypting the encrypted user data to produce cleartext data; g) returning cleartext data.

In some embodiments encrypting and decrypting are performed using one or more user's public/private key pairs.

In some embodiments the method further comprises storing the mapping locally.

In some embodiments, the method further comprises storing the mapping using a remote mapping service.

In some embodiments, the method further comprises upon initiating modification, locally modifying the web application resource.

In some embodiments, the method further comprises further upon initiating modification, modifying the web application resource with a remote logic analyzer service.

In some embodiments, the method further comprises receiving and installing a modification to an application runtime that contains the added methods.

In some embodiments, the method further comprises installing a modification comprises installing a browser extension.

In some embodiments, the method further comprises functionality that modifies the web application resources is part of the client runtime.

According to another aspect of the present invention, there is provided processor implemented method of processing data comprising: i) in respect of outgoing data: a) tokenizing the data to produce tokenized data and returning the tokenized data; b) encrypting the data to produce encrypted data; c) creating a mapping between the encrypted data and the tokenized data; the security feature processes incoming data by: ii) in respect of incoming data: d) extracting tokenized data; e) demapping the tokenized data to obtain corresponding encrypted data; f) decrypting the encrypted data to produce cleartext data; g) returning cleartext data.

In some embodiments, the encrypting and decrypting are performed using one or more user's public/private key pairs.

In some embodiments, the method further comprises storing the mapping locally.

In some embodiments, the method further comprises storing the mapping using a remote mapping service.

In some embodiments, the method further comprises intercepting one or more search terms in a search field before the search field is submitted to a web app server; for each search term, constructing a list of tokens that have been used to represent the search term; generating a modified search field by for each search term, replacing the search term in the search field with an OR expression composed of the list of tokens used to represent the search term; submitting the modified search field containing the OR expression(s) to the web app server.

In some embodiment, there is provide computer readable storage medium having computer executable instructions stored thereon that when executed by a computer cause the computer to perform the method as described herein.

In some embodiments, there is provided a system comprising: a processor; memory; at least one user interface; an application runtime with user data interception and processing for execution by the processor configured to receive web application resources executable on the application runtime, and modify the web application resources by adding methods at least some of which pertain to processing of user data.

In some embodiments, the method further comprises for at least one of the added methods: the added method overloads a runtime API method such that calls to the runtime API method are intercepted during execution.

In some embodiments, the method further comprises an interceptor that modifies the web application resources to produce modified resources by replacing calls to at least one first method that pertains to processing of user data with calls to at least one of the added methods such that calls to the first methods are intercepted prior to execution.

In some embodiments, the method further comprises for at least one of the added methods: the added method overloads a runtime API call such that calls to the runtime API method are intercepted during execution; the system further comprising: an interceptor that initiates modification of the web application resources to produce modified resources by replacing calls to at least one first method that pertains to processing of user data with calls to at least one of the added methods such that calls to the first methods are intercepted prior to execution, wherein the at least one first method is a method for which a method has not been added that overloads a call to the first method.

DETAILED DESCRIPTION

An approach to addressing the problem described in the background is the use of gateways which reside within the organizations and act as a proxy to the web application services. In these cases, the user browser opens a secure session with the gateway (instead of the application server). The gateway tokenizes the user data, then forwards these tokens to the web application services as part of a separate secure network session (e.g. HTTPS). The gateway maintains the relationship between original user data and its tokens, and resolves tokens that are returned as part of web application server responses.

This approach has a few limitations. First, the gateway must be aware of the application network payload structure in order to determine what is truly user data versus other data used by the application. Not doing so would potentially break the web application. As a result, a limited number of applications may be practically supported.

Second, for highly sensitive data, the gateway does not offer a security level beyond that of the gateway administrator, since the gateway has access to the user clear-text data (at least in-memory).

Third, mobile and home users are forced to connect to their corporate network in order to get access to the gateway before using a publically available cloud application.

Finally, the gateway solution does not address the needs of personal users (consumers), nor is it practical for small business since it requires local deployment, and management by a qualified team.

Figure 1:
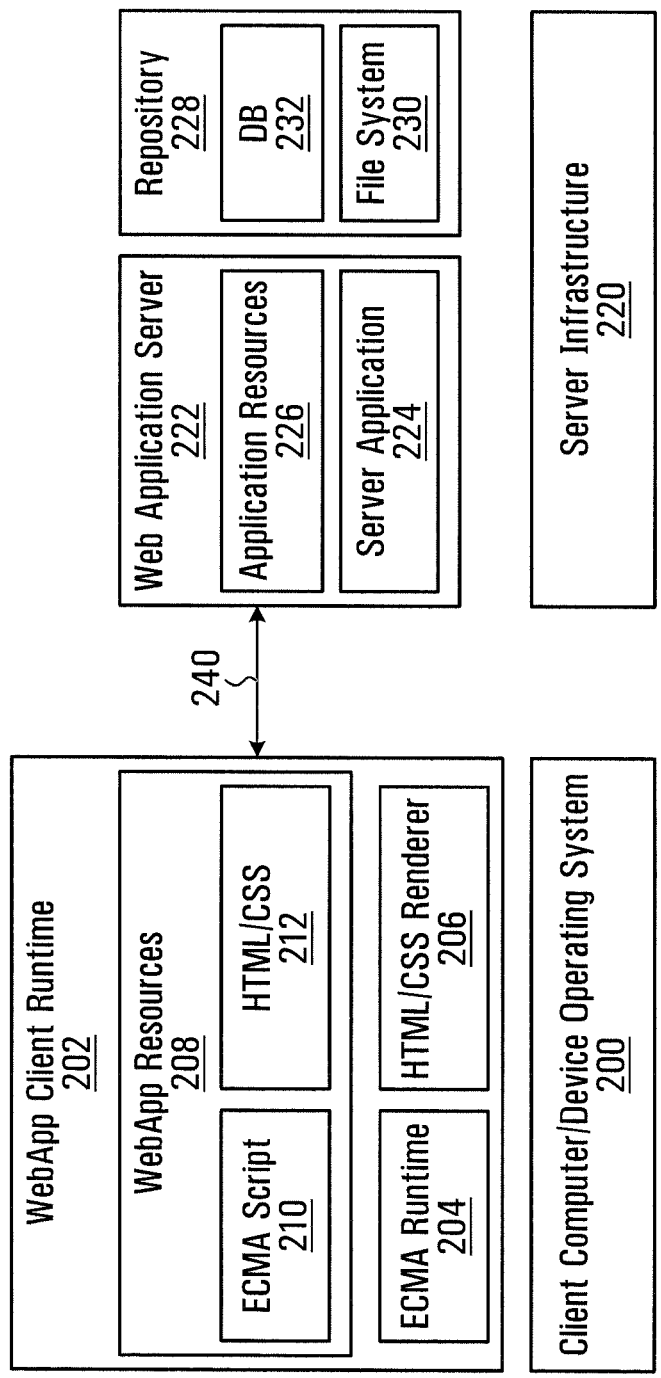
FIG. 1 is a block diagram depicting the components of a web application.

As shown in FIG. 1, an example set of client side functionality for realizing a Web Application (WebApp) includes WebApp client resources 208, executing within a client runtime 202, such as a web browser, which is hosted on a client computer/portable device 200. In some embodiments, W3C standards are employed, and the client runtime 202 is a browser, using a network stack to communicate data, while providing a renderer, such as a standard-based renderer (e.g. HTML (hypertext markup language)/CSS (Cascading Style Sheet) Renderer 206) for rendering HTML, CSS and other visual resources into a web page that is displayed to the user. In addition, the runtime 202 provides an ECMAScript (JavaScript) runtime 204, responsible for the execution of JavaScript resources which may be downloaded as a separate resource or embedded inside HTML resources.

In this example, Web App client resources 208 would be composed of W3C WebApp client resources that include client-side logic 210, typically written in ECMA Script (JavaScript) in conjunction with a DOM (document object model) API, as well as user interface resources 212, typically using HTML/CSS. Web-based applications typically follow the above described model.

Server side functionality includes a server-side application 224, running on a web application server 222, hosted within a server infrastructure 220 (e.g. cloud-computing). The server 222 also includes application resources 226. Also shown is a repository 228 containing file system 230 and database(s) 232 typically forming part of server infrastructure 220.

Under this model, user data associated with a web app being hosted by the web application server 222 is stored by the server infrastructure using a variety of data repositories, such as file system 230, and database(s) 232. Client and server components exchange user data as well as application resources through data network protocols and devices, generally indicated at 240, for example using TCP/IP standards such as HTTP(S) and FTP(S).

Data integrity and privacy is provided by securing the network session between client and server such as in the case of SSL and TLS. Even when such session-based security protocols are used, both client and server-side components have full access to the original clear-text version of the data.

This information travelling on the network contains two categories of data: user-data representing data entered by the user, and control-data representing data specific to the WebApp and necessary for its operation, such as record ids, operation codes, state information, etc.

Embodiments of the invention provide a method for automatically identifying user data, without prior knowledge of the WebApp, and invoking a data handler. Handlers add one or more desired aspects to a WebApp transaction. Examples of aspects that may be added to a WebApp transaction in this manner include, but are not limited to:

intercepting user data for the purpose of applying a security algorithm in order to ensure WebApp server components do not have access to private user data, while leaving control data intact;

capturing user data, along with its metadata, in order to send the data to another system;

intercepting user data in order to support monitoring of access to key data;

intercepting user data in order to support automatic classification of records (e.g. protected, confidential, secret, etc.);

intercepting and modifying user data for the purpose of translating and transforming keywords using a predefined dictionary; and intercepting user data to enforce business rules and data validation, including verification of user activities performed before/after entering the applicable data.

This description contains many references to security algorithms. Some examples of security algorithms include encryption, which includes encryption/decryption operations using symmetric and asymmetric keys, the use of user-based certificates for authentication and privacy, as well as tokenization of cleartext data. Tokenization refers to the process of replacing cleartext data with random, or partially random, strings, referred to as tokens.

Figure 2A:
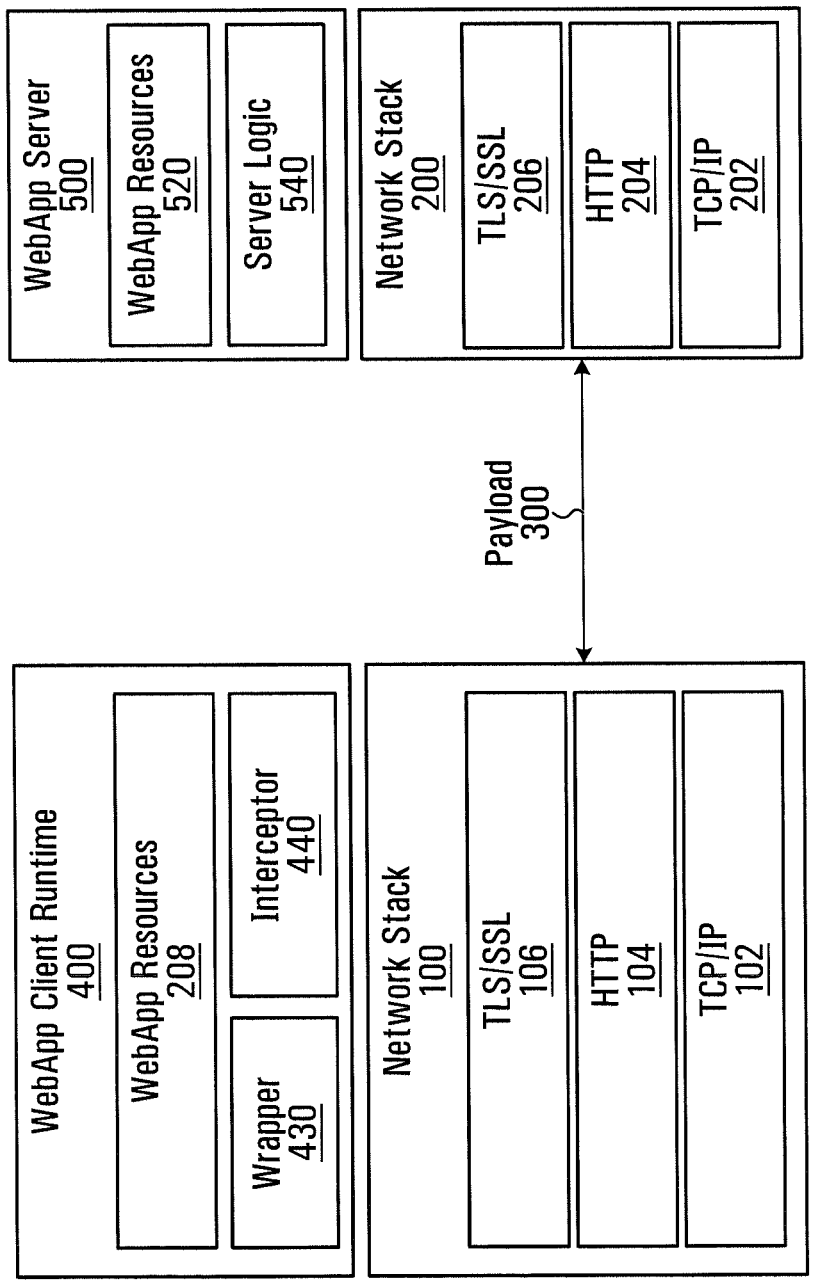
FIG. 2A shows the various network and application layers involved in a web application client and server, with data intercepting and processing components provided by embodiments of the invention.

FIG. 2A shows the various network and application layers involved in a WebApp client and server, with data intercepting and processing components provided by embodiments of the invention. On the client side, the network stack, 100, includes the physical, TCP/IP, HTTP, and TLS layers, blocks 102, 104, and 106. On the server side, a corresponding network stack is shown in block 200 with its corresponding layers in blocks 202, 204, and 206. The network stacks are used to exchange the application payload, block 300, which includes user private data as well as application control data.

The application layers of a WebApp client runtime 400 include the WebApp resources 208. Also shown are components of an embodiment of the invention; a network interceptor 440 that provides for WebApp resource modification, and wrapper 430 (also referred to herein as wrapper resources), providing data interception and processing functionality. Various data processing examples were given above, including applying data security algorithms to the user data while leaving the control data in its original format in order to maintain application functionality.

On the server, the application layers of a WebApp server 500 include WebApp resources 520 and server logic 540. No change is required on the server-end in order for the injected wrapper data processing functionality (e.g. injected security algorithms) to work on the client side.

Figure 2B:
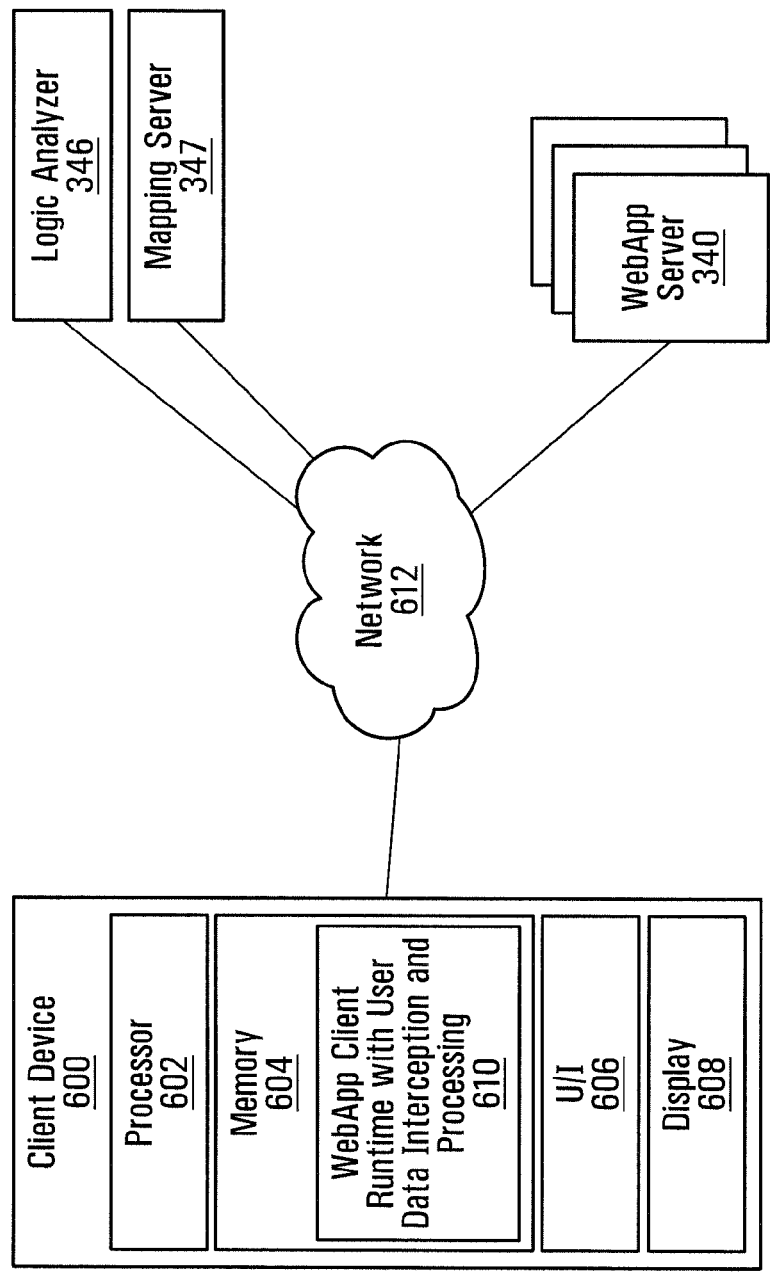
FIG. 2B is a block diagram of a system for intercepting and processing user data provided by an embodiment of the invention.

FIG. 2B is a block diagram of a system for intercepting and processing user data providing an embodiment of the invention. Shown is a client device 600. This may be a desktop computer, laptop, mobile device to name a few specific examples, and more generally is any client processing platform. The client processor 602, memory 604, user interface 606 and display 608. The memory 604 contains a web application client runtime with data interception and processing 610 that is executable by the processor. Web application client runtime 400 of FIG. 2A is specific example of component 610. The client device 600 is connected to a network 612 which may for example be the public internet. Also connected to the network is a logic analyzer 346 and mapping server 347, although as detailed below, the functionality of these components may alternatively be implemented on the client device. Also shown is a number of web application servers 340. The client device 600 is configured to perform user data interception and processing, for example pertaining to the exchange of user data with web servers 340. Web servers 340 are not specific web servers; rather, this data interception and processing can be performed in respect of any interactions involving user data that the device is configured to recognize, irrespective of what the web server on the other end of the interaction might be. For example, the data interception and processing may be used to apply a level of security to communications with the web application servers 340 that do not rely on a third party hosting secure data. This allows client device 600 to be used to interact with $3^{rd}$ party applications with user data security.

Figure 3:
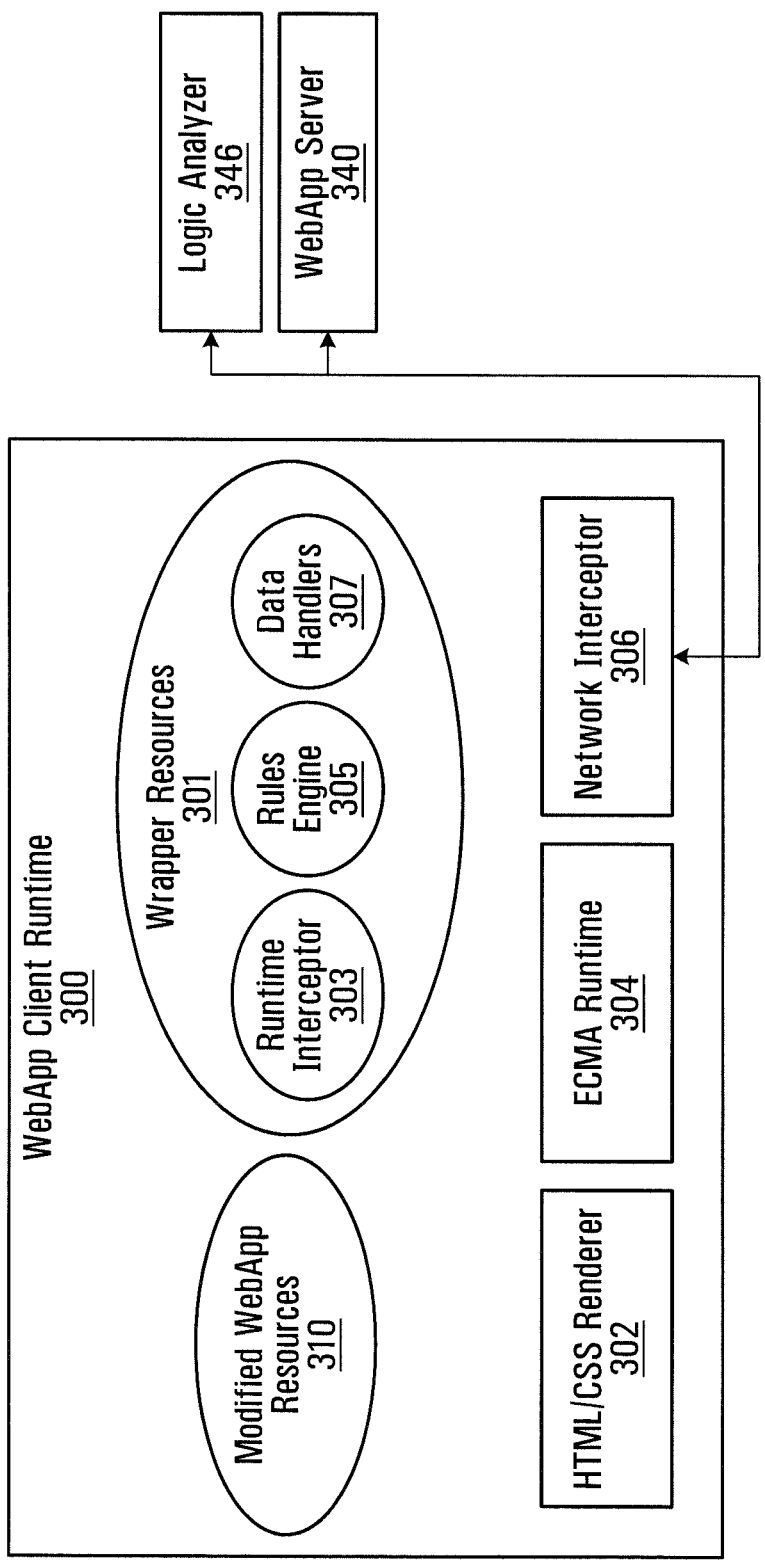
FIG. 3 is a block diagram depicting the components of a web application along with data interception and processing components provided by an embodiment of the invention.

FIG. 3 is a block diagram showing more details of an example implementation of the client runtime of FIG. 2. Client runtime 300, which in this example is a W3C WebApp client runtime (e.g. web browser) includes an HTML/CSS renderer 302 and an ECMA runtime 304. Also shown is a network interceptor 306, which inspects resources retrieved over the network. Also shown is wrapper resources 301 that include a runtime interceptor 303, rules engine 305 and data handlers 307, all detailed below. In some embodiments, the network interceptor 306, wrapper resources 301 are installed on the client device. Where the runtime is a browser as is the case in FIG. 2A, this may come in the form of a Browser Extension. Once installed, all applications accessed using the browser are intercepted and data processing logic (e.g. encryption) injected where needed. Alternatively this functionality may be directly implemented as part of the client runtime.

On the server side, a WebApp server 340 provides WebApp Resources for retrieval by the WebApp client runtime 300.

Also shown is a logic analyzer 346 accessible by the interceptor 306. The logic analyzer 346 may be provided locally on the device running client runtime 300 or on a server. More specifically, in some embodiments, the logic analyzer 346 is installed on the client device when the remainder of the functionality described herein is installed. Alternatively, the logic analyzer is hosted remotely for example by an entity making the data interception facility available.

In operation, after retrieval of WebApp resources over the network, the interceptor 306 processes the retrieved resources, injects wrapper resources 301 as part of the overall WebApp resources, and/or modifies the retrieved resources by invoking the logic analyzer 346 which produces the modified WebApp resources 310. The runtime interceptor 303 intercepts, through overloading where possible, certain runtime API calls and events callbacks and processes the intercepted calls and callbacks using the rules engine 305 and/or data handlers 307. To the extent such interception is possible, it is not necessary for the interceptor to modify WebApp resources. In cases where overloading and/or event callback is not sufficient, the interceptor 306 modifies the application code to explicitly call the wrapper functions runtime interceptor 303 instead of the client runtime, to produce the modified WebApp resources 310 as discussed above. The modified resources are produced by invoking the Logic Analyser 346 which parses the JavaScript code and replaces configured API functions with calls to the wrapper functions. The parsing may for example use commonly available JavaScript engines, such as Rhino, in order to construct an AST (Abstract Syntax Tree), which is processed in order to replace certain functions and operations with direct calls to Wrapper functions. The modified AST is then serialized to produce the modified version of the JavaScript resource.

The runtime interceptor 303 is responsible for intercepting at least one of:

specific runtime API calls, made by the WebApp script resources; to the WebApp client runtime DOM API.

callbacks made by the WebApp client runtime to the WebApp script resources.

The runtime interceptor also contains methods that are called directly by the modified WebApp script resources 310. These methods may be the same as the overloaded methods described below.

The runtime interceptor 303 relies on, for example:

a) Registering DOM Events such as Form Submit, and Page Load events. These are callbacks initiated by the runtime and used to intercept data before a form is submitted or a page is loaded, as described by the above patterns.

b) Overloading of DOM, AJAX (XMLHttpRequest), and other ECMA objects, in order to intercept specific calls and instead call an overloaded method provided by the runtime interceptor 303. The overload uses DOM and XMLHttpRequest prototype in order to intercept calls made by the WebApp script resources before reaching the runtime. Examples includes API call to get/set input field values in a form.

c) The modification done by the Logic Analyser to replace calls to the client runtime with calls to methods in the runtime interceptor.

Once a method in runtime interceptor is called (either through the overloading mechanism or resource modification), the method wraps the original call as follows:

a) Performs data processing on the passed-in parameters for example by executing a data handler;

b) Calls the originally called method provided by the client runtime (e.g. client runtime API);

c) Performs data processing on the resultant data returned from the client runtime.

The data processing is controlled by the rules engine 305, while the data handlers 307 provide the actual data processing implementation. An example of how the rules engine 305 is invoked upon such interception is detailed below with reference to FIG. 5.

A specific example of how a method forming part of runtime interceptor 303 can be called through the overloading mechanism or web resource modification mechanism will now be described. As an example, overloading of HTML Input value set function, in the case of FireFox, may be defined as:

window.HTMLInputElement.prototype.defineSetter ("value",overloadedHTMLInputValueSet(val))

In the above, overloadedHTMLInputValueSet is function that wraps the original API call and performs the above described data processing operations.

In this case no modification to the code is required. However, where such overloading is not supported by the client runtime, the WebApp resources are modified, using the Logic Analyser, to replace JavaScript statements, with a direct call to overloadedHTMLInputValueSet, as per below:

Original statement: element.value="newvalue"

Modified statement: overloadedHTMLInputValueSet.call (element, "newvalue")

Referring again to FIG. 3, the data handlers 307 are the methods that perform the actual data processing referred to in a) and c) above. The rules engine 305 contains functionality for deciding whether to apply a data handler and/or which data handler to apply.

The wrapper resources 301 may also provides resources for:

User interface to allow users to configure rules, described below, and data access control/sharing policies.

Communication between data handling functions and remote components such as a logic analyzer, mapping service, and rules service, detailed further below.

Depending on the runtime, different implementations may leverage different programming interfaces to define and register the interceptor and inject Wrapper resources. In some embodiments, in case of MS Internet Explorer (MSIE), the Interceptor is an ActiveX component implementing Asynchronous Pluggable Protocol API, that parses HTML resources in order to add inject the wrapper resources. In this case the wrapper resources may include:

JavaScript resources injected as a SCRIPT tag. These resources intercept API calls and listen to event callback, as described above.

ActiveX native components that implement encryption functions.

An injected IFRAME responsible for communicating with remote services and ActiveX components.

In the case of FireFox, in some embodiments, the Interceptor and Wrapper resources are implemented as a browser extension composed of the following:

An Interceptor objects implementing Observer API in order to inject the Wrapper JavaScript resources as a <script> tags in each frame.

Wrapper JavaScript objects, running in privileged space, providing communication to remote service, and encryption function through calls to native libraries. Factory API may be used to inject references to these objects into the non-privileged Wrapper code.

User interface implemented using FireFox XUL.

Figure 4:
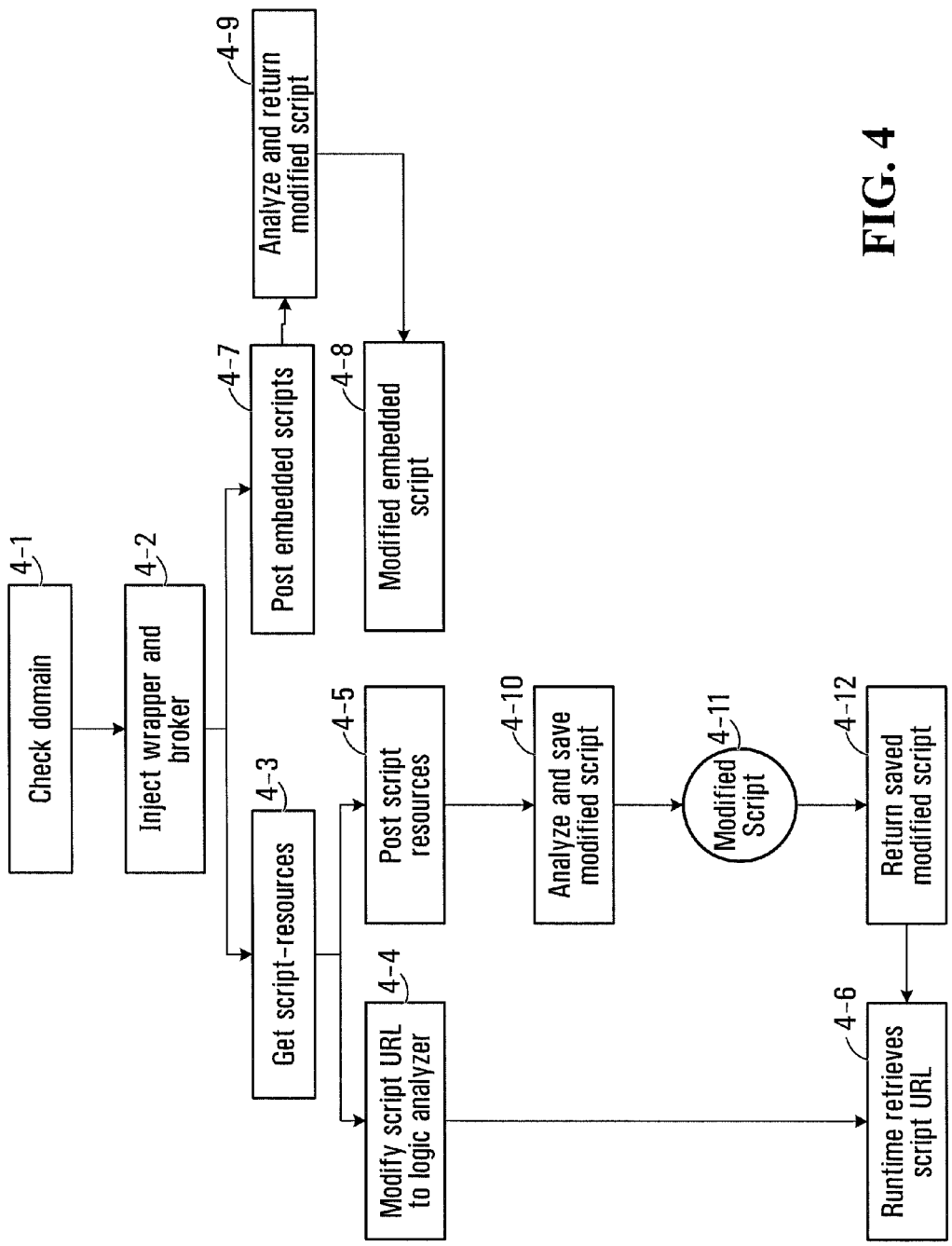
FIG. 4 is a flowchart of a method of injecting logic into web application resources in order to intercept operations performed by a user/application.

Referring now to FIG. 4, shown is an example of a method used by the network interceptor in one embodiment. For every page retrieved by the browser, the interceptor checks its source domain in block 4-1. If such domain is not configured for further processing by the interceptor, its content is forwarded to the browser as is. Otherwise the interceptor modifies the page content as described below. The configuration rules identifying applicable domains may be stored locally or fetched from a trusted server using secure web protocols such as HTTPS.

In block 4-2, the interceptor modifies each frame on the page by injecting Wrapper resources. In order to modify the WebApp JavaScript code, the Interceptor handles both JavaScript resource downloaded from a URL, block 4-3, and JavaScript code embedded in a SCRIPT tag within an HTML resource, block 4-7.

In the case of URL sourced WebApp JavaScript resource, the interceptor retrieves the content of the URL in block 4-3, then posts it along with URL details and HTML headers to a Logic Analyser service in block 4-5. The Logic Analyser modifies the script code as described above, and in block 4-10 saves the modified script 4-11.

Once the browser runtime loads that script URL in block 4-6, the Logic Analyser resolves it in block 4-12 to the modified script 4-11 that was previously saved. In the case of MSIE, this may be accomplished by having the interceptor modify the HTML resource and replace the original JavaScript URL with another URL referencing the Logic Analyser's version of that same script in block 4-4. In the case of FireFox, the script content can be modified directly by the interceptor as it is being retrieved, using the browser TraceListener API, without having to modify the HTML resource.

In the case of embedded script resources, in block 4-7 the embedded script tag content is posted to the logic analyzer service and then analyzed at block 4-9. The interceptor then modifies the script tag content with the new content returned at block 4-8.

As detailed above, the WebApp JavaScript modification is applied for both embedded and URL sourced resources. In both cases the actual code modification performed in blocks 4-7 and 4-9 is performed by a Logic Analyser, which can be local to the device, or provided as a remote service. In order to improve performance, once the above steps have been performed, subsequent calls to the same JavaScript resource may leverage a persistent cache of "learned" application logic, which accordingly instructs the interceptor to allow the original resource to be loaded from the WebApp, or replace its content with the modified version, possibly from cache.

While the above described embodiment, in FIGS. 3 and 4, is based on MSIE and FireFox implementations of W3C WebApp standards, it should be apparent that other embodiments of the invention can be similarly implemented over other browsers such as Safari, and Chrome. In addition, the same methods may be implied to other runtime environments that use proprietary languages, such as Adobe Flash and MS Silverlight, given that they are interpreted languages that allow for application logic to be modified by a Logic Analyser following the same general methods described above.

Figure 5:
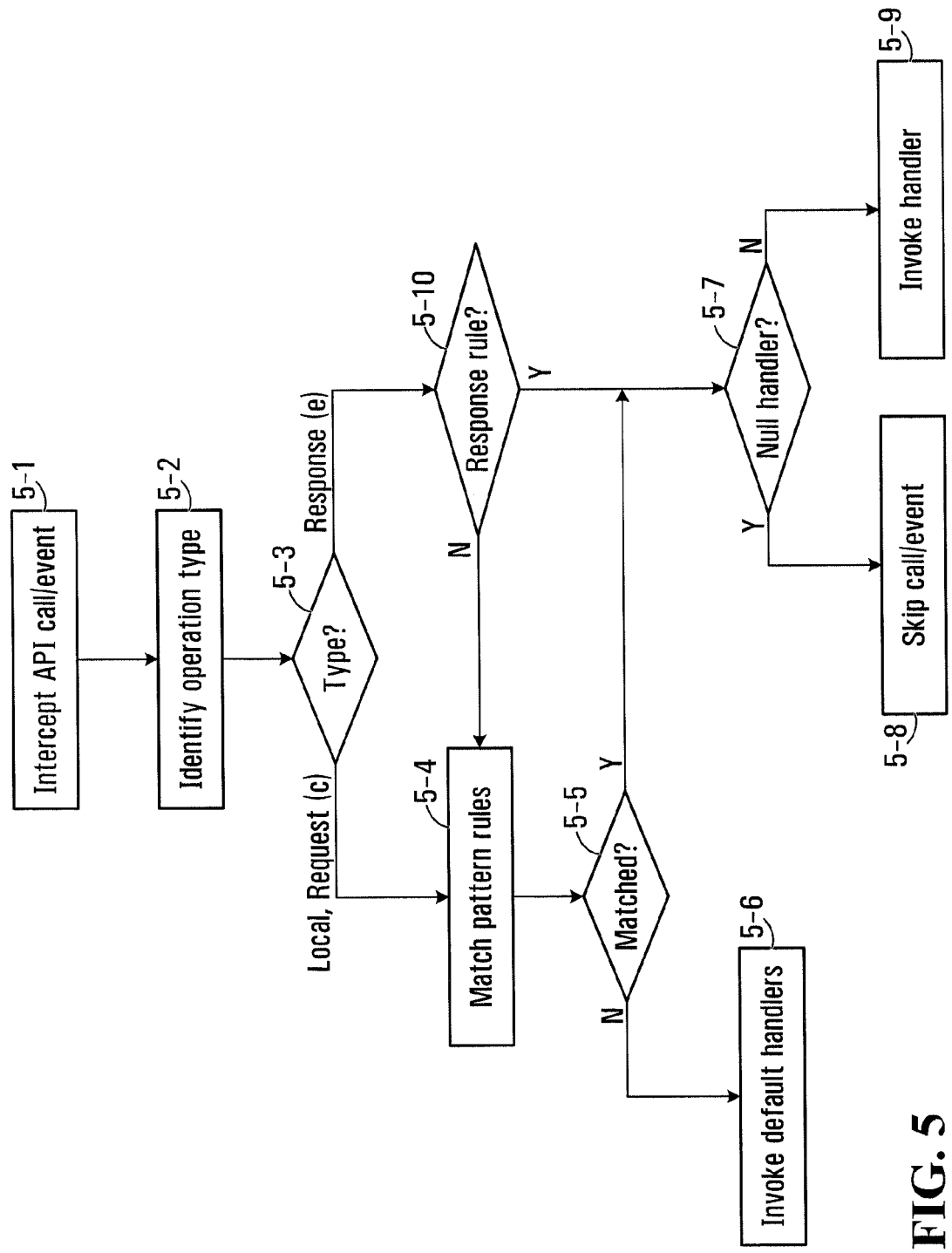
FIG. 5 is a flowchart of a method of matching intercepted operations to known Patterns and subsequently invoking configured handlers.

FIG. 5 shows an example of a method used by the wrapper resources (for example rules engine) in order to apply rule-driven logic to detect and process user data.

The wrapper, in block 5-1, wraps the EMCA and DOM API in order to intercept API calls made by the application resources and register for event callbacks. Examples of intercepted operations may include, but are not limited to:

Retrieving an HTML page/frame and processing its content through Body.onload event callback.

Submitting a Form and processing its content through Form.onSubmit event callback.

Programmatically Opening a URL, using DOM API calls such as Window.open.

Injecting HTML Frames through DOM manipulation APIs.

User Input, such as text typed into a Form input field.

User data manipulation, such as appending strings that contain different user data elements.

AJAX request/response, using XMLHttpRequest or other means of asynchronous communications such as WebSocket.

Modifying document content using API calls such as innerHTML, value, textContent, and appendChild.

Programmatically writing a Document, using DOM API calls such as Document.write.

The intercepted call is used to determine the operation type in block 5-2. The type may be a local operation (e.g. manipulation of a field), initiating request to server, or processing a response from server.

The type is checked, in block 5-3, and if the type is local operation or a request operation, the method continues at block 5-4, and the wrapper searches for an applicable rule, for example a pattern rule matching the given operation.

A pattern rule is a configuration object that identifies a JavaScript data processing function—a specific example of a data handler—that should be invoked when a given WebApp API call or event callback is intercepted. The pattern rules, are retrieved by the wrapper, from local resources and/or trusted remote services. In some embodiments, the JavaScript data handlers are implemented in the wrapper resources. In other embodiments, custom handlers can be defined as part of a pattern rule. Alternatively there may be a combination of data handlers implemented in the wrapper and custom handlers.

In addition, a rule may optionally indicate an array of conditions that must be true for a given data handler to be applied. These conditions may for example consist of logical expressions referencing node attributes and values of the current DOM element, frame, and page, where the current DOM element refers to the target associated with the event listeners or the object bound to the API call (where applicable). Accordingly, these conditions are logical expressions referencing for example one or a combination of:

Current DOM Element Attributes.
Related Element Attributes, e.g. HTML element with Label For attribute specifying a Form Input.
Current Frame URL.
Current Page URL.
Custom evaluators implemented through custom JavaScript that return a Boolean if the input element in question matches the expression During rule matching, block 5-4, rules are traversed in order of precedence until a match is found at block 5-5. Once a match is found, no further rule processing is performed and the configured data handler is invoked. If no rule was matched, default data handlers are invoked at block 5-6. If a rule was matched, it is checked for a NULL handler in block 5-7. A NULL handler, allow for the operations to be skipped in block 5-8. If there is non-NULL handler, it is invoked in block 5-9.

If the operation represents a server response, the method continues at block 5-10. A server response presupposes a previous corresponding server request. The wrapper first checks if the pattern rule that was matched for the corresponding server request operation, indicated a specific server response data handler. If so (yes path block 5-7), that specific handler is invoked. Otherwise (no path, block 5-7), the wrapper attempts to match a pattern rule in block 5-4 as described above for the local and request operations.

Under a W3C-based implementation model, user data is transmitted between server and client using a combination of the following general patterns:

Pattern 1: As part of loading HTML or Script URL. With this pattern, the client may send user data by including it as part of the URL while the HTML/Script content may contain user data from the server. An example is a page URL containing the user's bank account number which loads a list of related bank transactions.

Pattern 2: As part of the HTML Form action carried out through HTTP (client data to server). This is typically followed by loading of a URL which follows the above pattern. An example is a web form to transfer money to a recipient. The user fills the form fields and once the form is submitted, the browser loads a URL of a new page showing recent transactions.

Pattern 3: As part of asynchronous messaging calls (bidirectional communication between client and server), such as through HTTPXMLRequest standard object. This pattern is commonly referred to as AJAX. An example is a user filling the money transfer form as above, however instead of the browser loading a new page upon submission, the client logic submits the data in the background and modifies the applicable page content based on returned result.

In some embodiments, pattern rules are based on the above described W3C-based implementation. Where an implementation model different than W3C is used, a different set of rules and/or patterns may be used to transmit data from between client and server, and accordingly a different set of pattern rules would be applied.

More specifically, by applying the above logic, pattern rules may be defined to handle the W3C patterns described above. For example:

Pattern 1: When the user loads a new URL, a pattern rule instructs the wrapper to encrypt the user data that may be present in the URL, and call a function that decrypts the user data in the retrieved page when its DOM body.onLoad event callback function is invoked by the client runtime. In the same way, the pattern rule instructs the wrapper to call a function that encrypts user data when a new URL is loaded using window.open or document.location DOM API, or a link is clicked by the user, through onClick event callback.

Pattern 2: When the user submits a form, a pattern rule instructs the wrapper to call a function that encrypts the user data when its DOM on Submit event callback function is invoked by client runtime.

Pattern 3: A pattern rule instructs the wrapper to call a function that encrypts user data when XMLHTTPRequest calls are intercepted.

Figure 6:
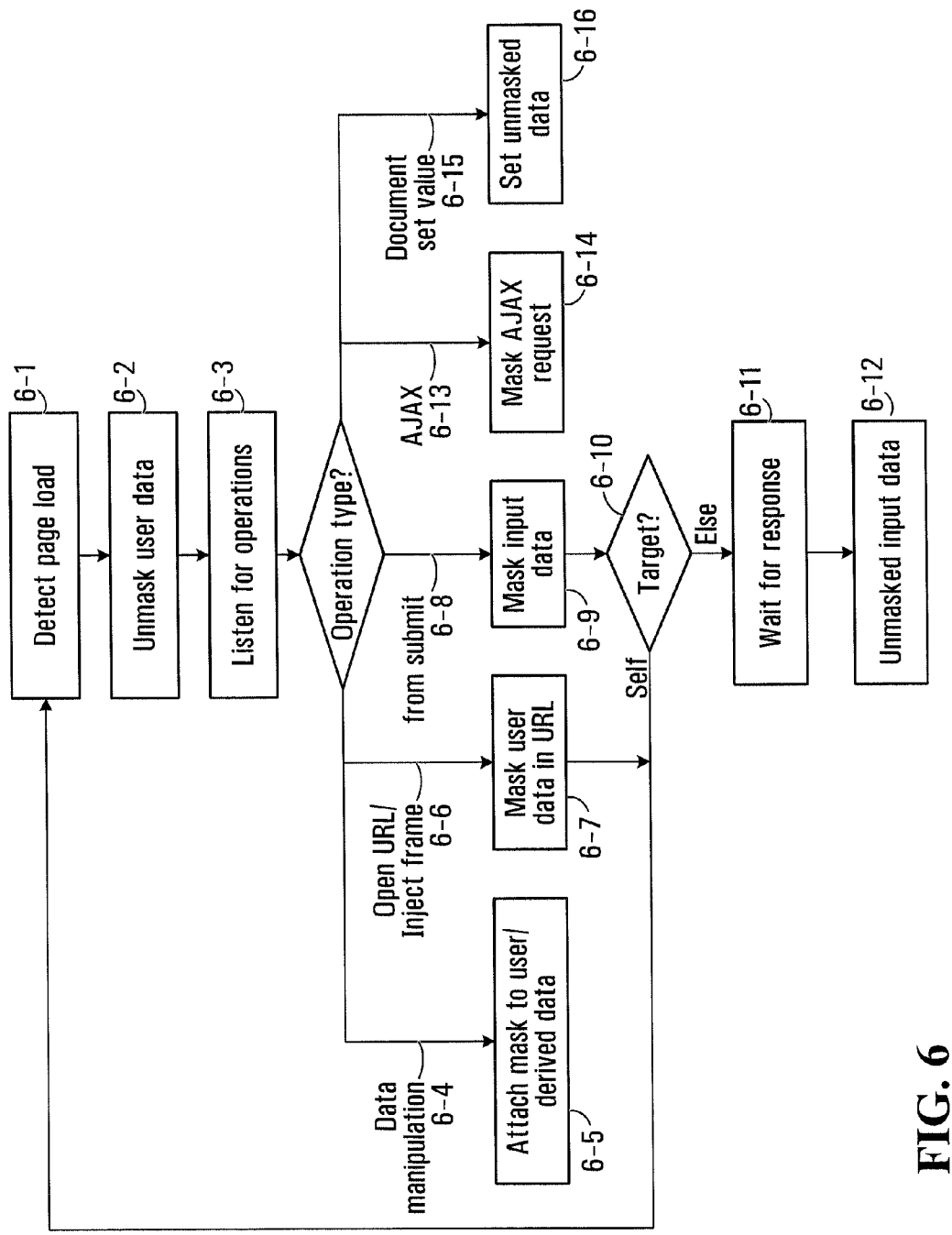
FIG. 6 is a flowchart of a method of intercepting browser based applications and applying security algorithms to user data.

FIG. 6 shows in more details how the user data security is implemented by configuring pattern rules. It should be understood that all data functions invoked by the wrapper follows the above described rule matching and data handler function invocation flow When a WebApp page is first loaded, in embodiments where data masking is performed, the wrapper intercepts the page load event in block 6-1. In block 6-2, the wrapper invokes a function that traverses the loaded document and identifies any attributes and text nodes which contain a token and restores user data by executing an unmask process. An example unmask process is described in detail in FIG. 8.

Subsequently, the wrapper listens to any DOM Events/API Calls, block 6-3, in order to detect WebApp logic and user operations.

Figure 7:
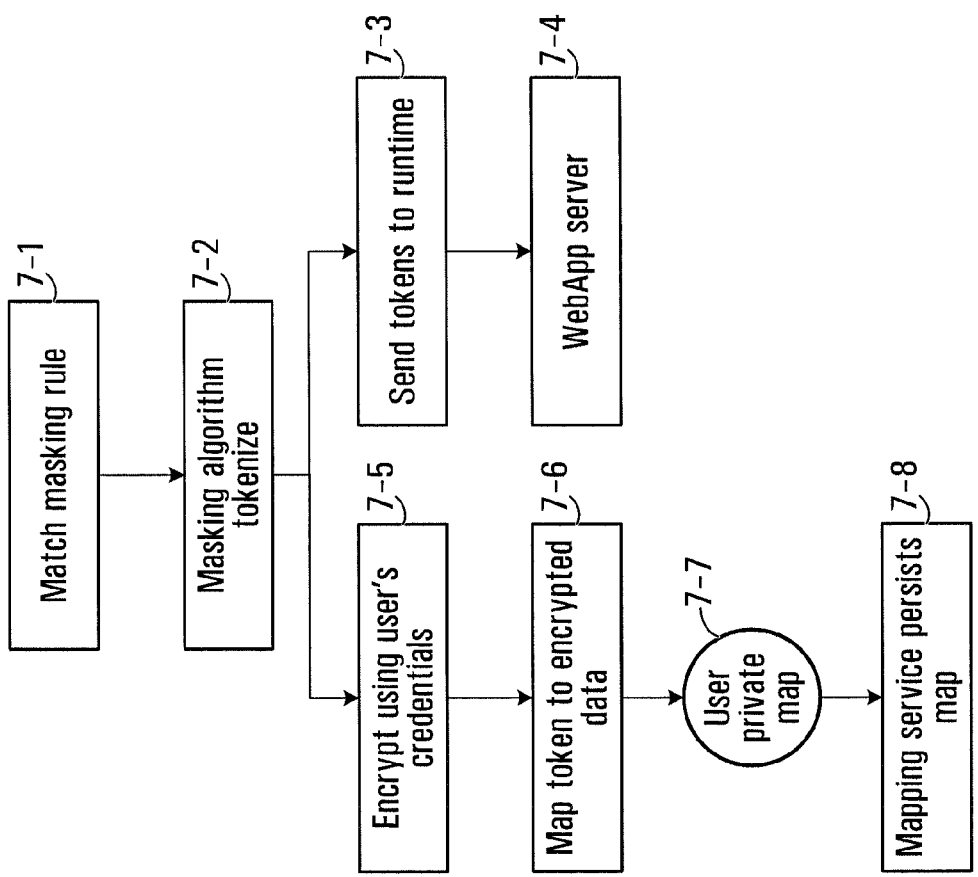
FIG. 7 is a flowchart of a method of using handlers to tokenize and encrypt user data.

When a call is made to read the value of an HTML Input field, block 6-4 (data manipulation), the wrapper invokes a data handler which reads the DOM input value and calculates the data mask value in block 6-5, further described in FIG. 7. The wrapper then returns a JavaScript String Wrapper Object, which extends standard JavaScript String prototype by adding a MaskValue property, which contains the masked value. In addition, by relying on the above described Logic Analyser, string operations, such as concatenation, and well as related operations such as arrays, are overloaded in order to return the result as a new instance of String Wrapper, where the derived user data (e.g. two user strings concatenated together) is stored along its masked equivalent. Accordingly, the relationship between JavaScript variables driven from the user data and their masked equivalent is maintained.

When a call is made to open a URL, in block 6-6, the wrapper intercepts URL opening operations such window.open DOM API. The wrapper data handler, block 6-7, inspects the URL string in order to determine if it is an instance of String Wrapper. If it is not, the runtime DOM window.open API is called without any modifications. Otherwise the String Wrapper masked value property is used as the URL when invoking the runtime DOM API.

Similar logic is applied when the Wrapper intercepts DOM API calls that appends or adds DOM elements. The Wrapper determines, block 6-6, if it is an IFRAME or FRAME tag and whether its source attribute is a server URL. If it is, the URL is inspected to determine if it is an instance of String Wrapper. If it is, the URL is replaced, block 6-7, with its masked equivalent in the same manner as described above.

In both cases, window open and frame injection, once the URL response is received from the server, control is returned to the normal page load detection, block 6-1.

In the case of a FORM submit, in block 6-8, the Wrapper intercepts the on Submit event, after all other WebApp event listeners, and verifies that its action attribute is set to invoke a server URL. If so, the Wrapper data handlers, in block 6-9, which use DOM API to replace the INPUT field values with their Masked equivalent.

The wrapper then checks, block 6-10, if the FORM target attribute is the current window. If it is, control is returned to the normal page load detection, block 6-1.

Otherwise, the Pattern Rule registers a data handler, block 6-11, to process the response of the FORM submission. The Wrapper in turns invokes this data handler once the target window is loaded. The data handler in this case is an extension to the handler used for page loads, which performs the same operation but additionally restores the FORM INPUT values back to their original user data, block 6-11, using their associated String Wrapper objects.

In the case of AJAX, in block 6-13, the wrapper intercepts DOM XMLHTTPRequest calls. The wrapper data handler inspects, in block 6-14, the destination URL as well as the data to be posted (if any). It accordingly determines if they are any instances of String Wrapper, and if so, uses their masked equivalent when invoking the XMLHTTPRequest methods.

Once an attempt is made to set the value of a DOM node, block 6-15, the Wrapper data handler checks if the passed-in value is an instance of String Wrapper and if an unmasked data version exists. If found, the unmasked version is used to set the node value. Otherwise, an unmask operation is performed, and the result clear-text value is used to set the DOM node value.

It should also be understood that the use of String Wrapper object is one possible approach to detecting/tagging user data that require a mask value. Another techniques which may be used to achieve the same result, involves encoding strings using reserved Unicode characters that do not occur in the user data—for example using character sets from languages not used by the user. In this case the wrapper uses the mask value, as a primitive string type, when communicating with the WebApp resources. On the other hand, the wrapper uses the original user data when communicating with the client runtime DOM API. A mapping between the mask value and original user data is maintained in memory.

While the above described embodiment represents a specific lifecycle, it should be apparent that other embodiments can be similarly implemented where by the above described Wrapper API interception, pattern rule matching and invocation of data handlers can be leveraged to detect other patterns and implement custom handlers. In the same way, the handlers are not limited to a specific security algorithm and the technique is easily adapted for other purposes such as data integration, policy enforcement, and local data persistence.

An example of a more complex pattern rules applies to Text Searching, where a user performs a text search by entering one or more word to be used to find matching records in the WebApp. In this case, the following data processing is done, where it is assumed the previously described tokenization has occurred a) When the user enters search terms in the configured search field—the field may be identified using its id or other attributes—the runtime interceptor intercepts the value of the search field before it is submitted to the web app server.
b) A handler is then invoked to construct a list of tokens that have been used to represent each of the search terms.
c) The handler then generates a modified search field by replacing each of the search terms supplied by the user with an OR expression composed of the above tokens. In order to enable such resolution of a term into a list of its tokens, data handlers may rely on local storage to maintain an index of tokens used for each term.
d) The runtime interceptor then submits the modified search field to the web app server.
e) The result from the web app server is displayed as usual, given that the OR expression would match all records that reference the original user-supplied search terms.

As an example, search words of 'legal compliance' would be replaced by '(token1 OR token2 OR token3) AND (token4 OR token5)'. Where token1, token2, token3 are token values that have been used during the lifetime of the system to replace the word 'legal', while token4 and token5 have been used to represent the word 'compliance'.

FIG. 7 shows a method used to calculate masked value of a given string. Calculating a masked value is a specific example of a data handler. Once a user input is intercepted as described above, the mask operation, in block 7-1, attempts to match a masking rule. The masking rule is a configuration object identifying the conditions that must be met for a given masking algorithm, if any, to be applicable. These conditions are logical expressions referencing for example one or a combination of:

DOM Element Attributes.
Related Element Attributes, e.g. HTML element with Label For attribute specifying a Form Input.
Current Frame URL.
Current Page URL.
Custom evaluators implemented through custom JavaScript that return a Boolean if the input element in question matches the expression.

In some embodiments, the masking algorithm is a JavaScript object implementing tokenization and encryption functions. Masking algorithm tokenization, executed in block 7-2, replaces user data with tokens that meet the syntax restrictions required by the application, and specified as part of the masking rule. For example, elements such as phone numbers, postal codes, etc. may be tokenized into another value which still meets applicable syntax requirements.

In one embodiment of the innovation, the masking algorithm, selects a unique token, which is composed of two random values, with no mathematical relationship to user data. The values identify a record and field respectively. The two values are assembled into a string, following a known structure and encoding, which does not occur in user data. Examples include encoding the string using reserved UNICODE characters representing languages not used by the user.

User data is then swapped with the tokens, block 7-3, and sent to the WebApp server in block 7-4. At the same time, the original user data is encrypted, in block 7-6, using the user's credentials—e.g. user issued certificate with one of more public/private key pair. Encryption may also be done using the public keys for other users authorized to see the data.

A data structure or map 7-7 mapping the encrypted user data to its tokens is generated. The map may also include related metadata such as page URL, element DOM path, and element ID. The map is persisted locally and/or on a remote mapping Service, block 7-8.

Figure 8:
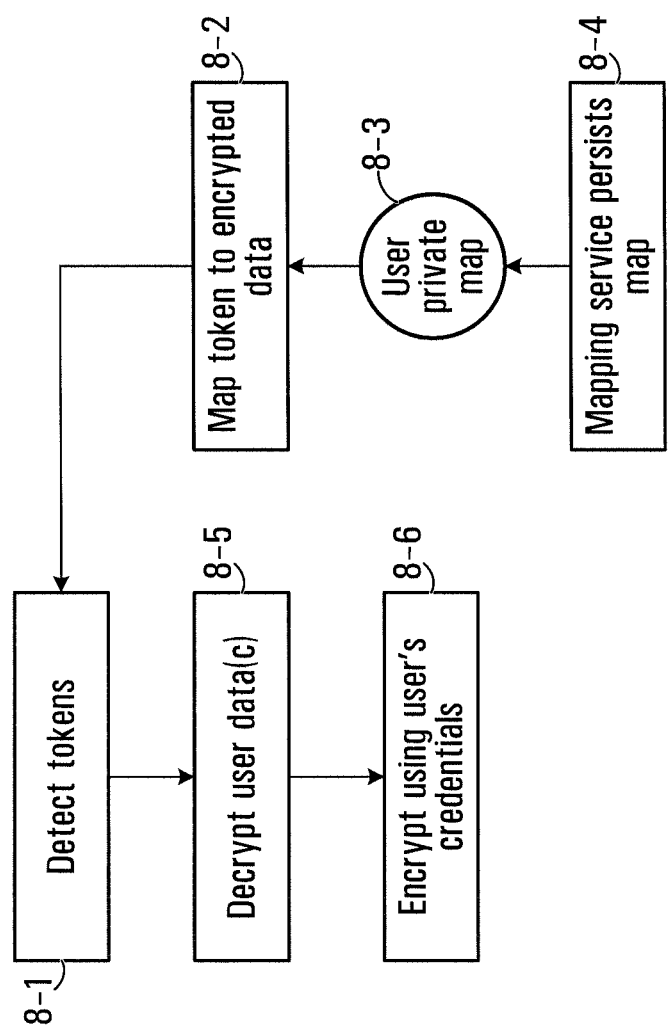
FIG. 8 is a flowchart of a method of using handlers to decrypt and restore user data from the tokens.

FIG. 8 shows a method used to restore user data from its masked value. Once unmask is invoked its input data is parsed, in block 8-1, to detect strings that match memorized tokens, based on the user private map retrieved in block 8-2, from the mapping service, block 8-3. The user private map is persisted by a mapping service at 8-4. The matching is assisted by the fact that tokens are unique and follow a known structure/encoding. The matching may be further restricted using conditions on the meta data stored in the map.

In block 8-5, once a match is found, the associated user data is decrypted using the user's private key. The decrypted—original cleartext data—is then returned in block 8-6.

Numerous modifications and variations of the present disclosure are possible in light of the above teachings. It is therefore to be understood that within the scope of the appended claims, the disclosure may be practiced otherwise than as specifically described herein.

The invention claimed is:

1. A processor implemented method on a client device, the method comprising:
   receiving web application resources associated with a web application;
   modifying the web application resources by adding methods at least some of which pertain to processing of user data of the web application; and
   executing the modified web application resources on the client device;
   wherein at least one added method that pertains to the processing of user data implements a security feature by intercepting user data without modifying control data for the web application, and replacing the user data with replacement data for the purpose of communicating with an external server, such that the external server is exposed to the replacement data but not the user data;
   wherein the user data represents data entered by a user and control data is data specific to the web application that is necessary for its operation.

2. The method of claim 1 wherein for at least one of the added methods:
   the added method overloads a runtime API method such that calls to the runtime API method are intercepted during execution.

3. The method of claim 1 further comprising:
   initiating further modification of the web application resources to produce the modified resources by replacing calls to at least one first method that pertains to processing of user data with calls to at least one of the added methods such that calls to the first methods are intercepted prior to execution of the modified web application resources.

4. The method of claim 3 further comprising upon initiating modification, modifying the web application resource by the client device.

5. The method of claim 3 further upon initiating modification, modifying the web application resource with a remote logic analyzer service.

6. The method of claim 1 wherein for at least one of the added methods:
   the added method overloads a runtime API call such that calls to the runtime API method are intercepted during execution of the modified web application resources;
   the method further comprising:
   initiating modification of the web application resources to produce modified resources by replacing calls to at least one first method that pertains to processing of user data with calls to at least one of the added methods such that calls to the first methods are intercepted prior to execution, wherein the at least one first method is a method for which a method has not been added that overloads a call to the first method.

7. The method of claim 1 wherein the added methods comprise:
   at least one data handler that processes user data;
   a rules engine that applies rules for each intercepted call to determine whether to process the user data with a data handler of the at least one data handler and/or to select which data handler to be used to process the user data.

8. The method of claim 7 wherein applying rules matching comprises attempting to identify patterns pertaining to how user data is handled by the web application resources and the server.

9. The method of claim 8 wherein attempting to identify patterns comprises attempting to identify at least one of the following patterns involving exchange of user data:
   loading HTML or Script URL in which user data is sent as part of the URL or in which HTML/Script content contains user data from as server;
   an HTML Form action carried out through HTTP (client data to server);
   asynchronous messaging calls.

10. The method of claim 1 wherein least one added method implements the security feature by:
    i) processing outgoing data by:
       a) tokenizing the user data to produce tokenized user data and returning the tokenized user data;
       b) encrypting the user data to produce encrypted user data;
       c) creating a mapping between the encrypted user data and the tokenized user data;
    ii) the security feature processes incoming data by:
       d) extracting tokenized data;
       e) demapping the tokenized data to obtain corresponding encrypted user data;
       f) decrypting the encrypted user data to produce cleartext data;
       g) returning cleartext data.

11. The method of claim 10 wherein encrypting and decrypting are performed using one or more user's public/private key pairs.

12. The method of claim 10 further comprising storing the mapping locally.

13. The method of claim 10 further comprising storing the mapping using a remote mapping service.

14. The method of claim 1 further comprising:
    receiving and installing a modification to an application runtime that contains the added methods.

15. The method of claim 14 wherein installing a modification comprises installing a browser extension.

16. The method of claim 1 wherein functionality that modifies the web application resources is part of the client runtime.

17. The method of claim 1 wherein at least one added method pertains to
    intercepting user data in order to support monitoring of access to key data.

18. The method of claim 1 wherein at least one added method pertains to one or more of:
    intercepting user data in order to support automatic classification of records;
    intercepting and modifying user data for the purpose of translating and transforming keywords using a pre-defined dictionary; and
    intercepting user data to enforce business rules and data validation, including verification of user activities performed before/after entering the data.

19. The method of claim 1 wherein the method that intercepts data does so without relying on any external server or proxy, in a manner that preserves data format and application behavior so as to be transparent to any server involved in providing the web application.

20. A processor implemented method of processing data on a client device, the method comprising:
i) in respect of outgoing user data:
a) tokenizing the data to produce tokenized data and returning the tokenized data;
b) transmitted the tokenized data in place of the outgoing user data; such that an external server is exposed to the replacement data but not the user data;
c) encrypting the user data using a public key of a public and private key pair to produce encrypted user data;
d) creating a mapping between the encrypted user data and the tokenized data;
the security feature processes incoming data by:
ii) in respect of incoming data:
e) extracting tokenized data;
f) demapping the tokenized data to obtain corresponding encrypted data;
g) decrypting the encrypted data using a private key of the public and private key pair to produce cleartext data;
h) returning cleartext data;
wherein the user data represents data entered by a user, the tokenizing being performed without relying on any external server or proxy.

21. The method of claim 20 further comprising storing the mapping locally.

22. The method of claim 20 further comprising storing the mapping using a remote mapping service.

23. The method of claim 20 further comprising:
intercepting one or more search terms in a search field before the search field is submitted to a web app server;
for each search term, constructing a list of tokens that have been used to represent the search term;
generating a modified search field by for each search term, replacing the search term in the search field with an OR expression composed of the list of tokens used to represent the search term;
submitting the modified search field containing the OR expression(s) to the web app server.

24. A non-transitory computer readable storage medium having computer executable instructions stored thereon that when executed by a client device cause the computer to perform a method comprising:
receiving web application resources associated with a web application;
modifying the web application resources by adding methods at least some of which pertain to processing of user data of the web application; and
executing the modified web application resources on the client device;
wherein at least one added method that pertains to the processing of user data implements a security feature by intercepting user data without modifying control data for the web application, and replacing the user data with replacement data for the purpose of communicating with an external server, such that the external server is exposed to the replacement data but not the user data;
wherein the user data represents data entered by a user and control data is data specific to the web application that is necessary for its operation.

25. A system comprising:
a processor;
memory;
at least one user interface;
an application runtime with user data interception and processing for execution by the processor configured to receive web application resources executable on the application runtime, and modify the web application resources by adding methods at least some of which pertain to processing of user data, and to execute the modified web application resources on the client device;
wherein at least one added method that pertains to the processing of user data implements a security feature by intercepting user data without modifying control data for the web application, and replacing the user data with replacement data for the purpose of communicating with an external server, such that the external server is exposed to the replacement data but not the user data;
wherein the user data represents data entered by a user and control data is data specific to the web application that is necessary for its operation.

26. The system of claim 25 wherein for at least one of the added methods:
the added method overloads a runtime API method such that calls to the runtime API method are intercepted during execution of the modified web application resources.

27. The system of claim 26 wherein the method that intercepts data does so without relying on any external server or proxy, and is transparent to any server involved in providing the web application.

28. The system of claim 25 further comprising:
an interceptor that modifies the web application resources to produce modified resources by replacing calls to at least one first method that pertains to processing of user data with calls to at least one of the added methods such that calls to the first methods are intercepted prior to execution of the modified web application resources.

29. The system of claim 25 wherein for at least one of the added methods:
the added method overloads a runtime API call such that calls to the runtime API method are intercepted during execution of the modified web application resources;
the system further comprising:
an interceptor that initiates modification of the web application resources to produce modified resources by replacing calls to at least one first method that pertains to processing of user data with calls to at least one of the added methods such that calls to the first methods are intercepted prior to execution, wherein the at least one first method is a method for which a method has not been added that overloads a call to the first method.

* * * * *